United States Patent [19]

Epple

[11] 4,084,729
[45] Apr. 18, 1978

[54] DISPENSING VALVE

[75] Inventor: Richard R. Epple, Glen Burnie, Md.

[73] Assignee: Maryland Cup Corporation, Owings Mills, Md.

[21] Appl. No.: 608,637

[22] Filed: Aug. 28, 1975

[51] Int. Cl.² ............................................. G01F 11/06
[52] U.S. Cl. ................................. 222/307; 222/309; 222/368
[58] Field of Search ...................... 222/424.5, 425, 434, 222/438–441, 444, 344, 351, 355, 361–363, 368, 505, 549, 552, 298–300, 301, 303, 304, 306–308, 383, 335, 309, 386, 389, 409; 417/900

[56] References Cited

U.S. PATENT DOCUMENTS

| 715,259 | 12/1902 | Glisson | 222/304 |
|---|---|---|---|
| 771,627 | 10/1904 | Glisson | 222/304 |
| 1,165,508 | 12/1915 | Irish et al. | 222/363 |
| 1,400,034 | 12/1921 | Dilley | 222/383 |
| 2,373,124 | 4/1945 | LeFrank | 222/307 |
| 2,916,057 | 12/1959 | Carle et al. | 222/309 |
| 2,975,942 | 3/1961 | Giordano et al. | 222/434 |

Primary Examiner—Robert B. Reeves
Assistant Examiner—H. Grant Skaggs
Attorney, Agent, or Firm—Birch, Stewart, Kolasch & Birch

[57] ABSTRACT

A dispensing valve is provided for dispensing metered quantities of liquid and semi-solid food products from a hopper or reservoir. The valve has a piston and piston rod reciprocating in a rotatable sleeve to which it is keyed and the latter being journaled for rotation coaxially within a cylindrical valve housing. By rotating and reciprocating a handle attached to the piston rod a transfer port in the sleeve is selectively positioned in registry with intake and discharge ports in the housing to fill the sleeve with food on the intake stroke of the piston and discharge the food from the sleeve on the discharge stroke of the piston. Bosses are selectively placed on the piston rod between the handle and the housing to vary the stroke of the piston and thus, the measured quantities of food ingested and dispensed by the valve.

11 Claims, 6 Drawing Figures

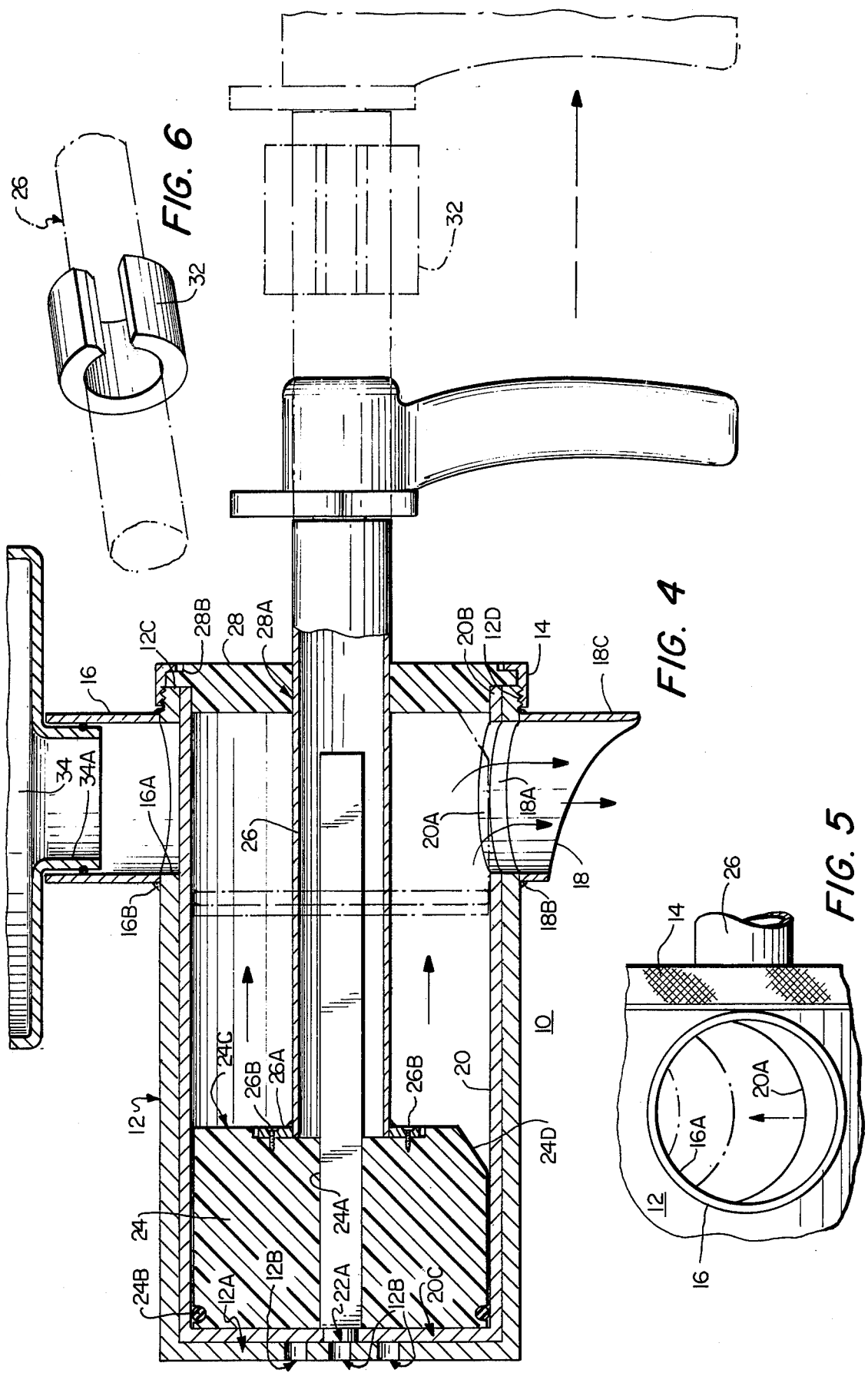

DISPENSING VALVE

FIELD OF THE INVENTION

This invention relates to dispensing valves and more particularly to dispensing valves for selectively dispensing discrete quantities of liquid and semi-solid foodstuffs with a composite reciprocating and rotary motion.

BACKGROUND OF THE INVENTION

In the dispensing of hot soups, chili, stews and the like, particularly in institutional type food service environments where numerous and accurate individual servings of food must be made, a dispensing valve must have the requisites of toughness, accuracy, adjustability (such as for dinner, lunch and snack-sized portions or for adult and children's portions) and cleanability, i.e., such a valve must be simple in structure with ready access to all parts thereof to permit complete sterilization and cleaning to preclude bacteria and other harmful matter from remaining in the valve after a given duty cycle.

Furthermore, the valve should be equally versatile in the dispensing of broths, gravies, sauces, chunky soups, stews and the like.

OBJECTS OF THE INVENTION

It is an object of the present invention to provide a new and novel volumetric dispensing valve for liquid and semi-liquid food products.

Another object of the present invention is to provide a new and novel volumetric dispensing valve for liquid and semi-liquid food products having a positive suction intake stroke and a positive dispensing stroke.

Still another object of the present invention is to provide a new and novel volumetric dispensing valve for liquid and semi-liquid food products having adjusting means to selectively vary the volume of food product dispensed thereby.

Yet another object of the present invention is to provide a new and novel volumetric dispensing valve for liquid and semi-liquid food products in which all of the component parts thereof may be readily disassembled for cleaning and sterilizing.

These and other objects of the present invention will become more fully apparent with reference to the following specification and drawings which relate to preferred embodiments of the invention.

BRIEF DESCRIPTION OF THE DRAWINGS

FIG. 4 is a cross-section of the valve of the present invention taken along line 4—4 of FIG. 2;

FIG. 5 is a detail in top plan of the interaction of the intake port of the valve housing and the common port in the rotary internal valve cylinder; and FIG. 6 is a detail of a volumetric adjusting device of the present invention.

SUMMARY OF THE INVENTION

Figure 1:
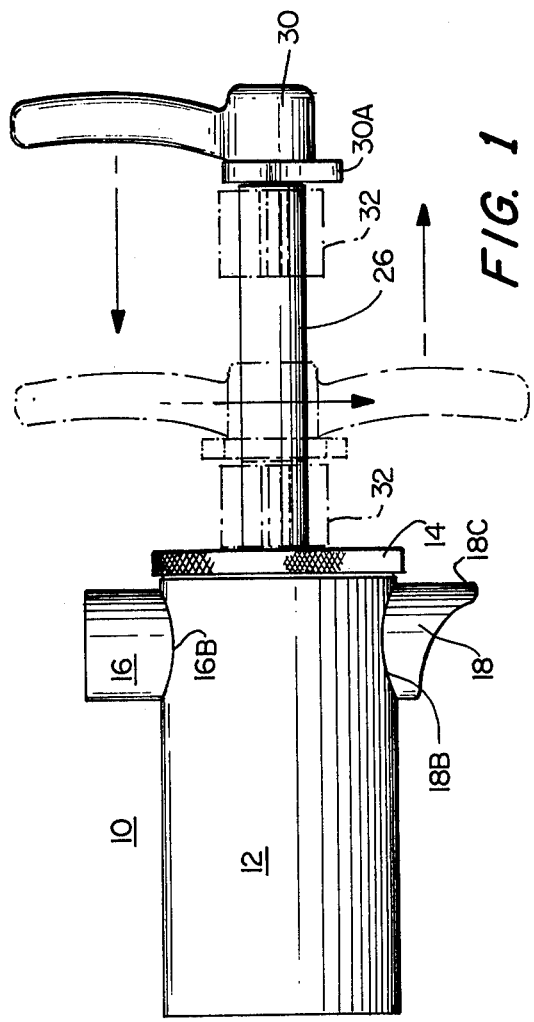
FIG. 1 is a side elevation of the valve of the present invention with the valve actuator extended to begin the intake stroke thereof and indicating the extreme reciprocal positions of the valve actuator.

The valve of the present invention comprises a cylindrical valve housing closed at one end and having inlet and discharge ports diametrically opposed at the open end thereof; a valve sleeve in the housing, closed at the inner end thereof coaxial and substantially coterminate with the valve housing and journalled for rotation therein; said valve sleeve having a common intermediate intake and exhaust port selectively rotated into registry with the inlet and discharge ports of the valve housing. An integral axially disposed guide bar of rectangular cross section is mounted internally on the closed end of the internal valve sleeve and extends along the major portion of the longitudinal axis of the sleeve. A bearing plate and retaining ring close the open ends of valve housing and valve sleeve.

A hollow valve actuator rod having a piston on the inner end thereof extends through the bearing plate. The piston is conformal with the inner dimensions of the valve sleeve and includes a key port of rectangular cross section which conformally receives the guide bar and permits it to telescopically extend through the piston and into the interior of the hollow actuator rod.

Thus, rotation of the actuator rod by a handle mounted on the exterior end thereof causes the valve sleeve to be rotated to index the common intermediate port into registry with the intake and discharge ports of the housing.

The stroke of the piston inwardly of the valve sleeve ingest material into the sleeve through the common port from the intake port, with the length of the piston stroke determining the quantity of material ingested.

To discharge this material, the actuator rod and sleeve are rotated to register the common port with the discharge port and the actuator rod is then pulled outward in a full stroke, thus forcing, via the piston, all of the material in the valve sleeve out through the common and discharge ports.

When the discharge is complete, the actuator rod and sleeve are first rotated to register the common port with the inlet port and the next inward stroke of the piston will cause ingestion a like quantity of material into the intake port and valve sleeve.

By limiting the stroke of the piston by suitable removable stops of selected dimension, the volume of material ingested and dispensed is selectively and predictably varied. In the preferred embodiment of the present invention the stops are split cylinders which are snapped on and off the actuator rod between the handle and the bearing plate.

DETAILED DESCRIPTION OF THE DRAWINGS

Referring in detail to the drawings and with particular reference to FIGS. 1, 2, 3 and 4, the valve 10 of the present invention is shown as including a cylindrical valve housing 12 having a closed end 12A provided with a plurality of vent holes 12B connecting the interior of the housing 12 to the atmosphere.

The opposite end 12C of the valve housing 12 is open and externally threaded at 12D to receive a threaded gland nut or locking ring 14.

Immediately adjacent the open end 12C of the housing 12 and in diametric opposition are an intake coupling 16 and discharge spout 18 which define, respectively, a smooth walled intake port 16A and a smooth walled discharge port 18A at their respective lines of intersection with and through the walls of the valve housing 12. The intake coupling 16 and discharge spout 18 are shown as comprising cylindrical pipe sections welded to the valve housing at weld lines 16B and 18B, respectively.

The discharge spout is cut-off at its lower end in an arcuate member to provide a splash shield 18C adjacent the open end 12C of the housing 12.

Conformally and rotatably fitted within the valve housing 12 is a valve sleeve 20 in the configuration of an open-topped cylindrical container having a common transfer port 20A adjacent the open end 20B of the sleeve 20, the said transfer port 20A being rotatable from a position in registry with the intake port 16A to a position in registry with the discharge port 18A. The dimensions of the transfer port 20A are substantially identical with those of the intake port 16A and discharge port 18A. This is best shown in FIG. 4 wherein the transfer port 20A is shown in registry with the discharge port 18A and together therewith and the discharge spout 18, defines a relatively smooth walled outlet passage for materials contained within the valve sleeve as will be more fully described with respect to the operation of the present invention.

Figure 3:
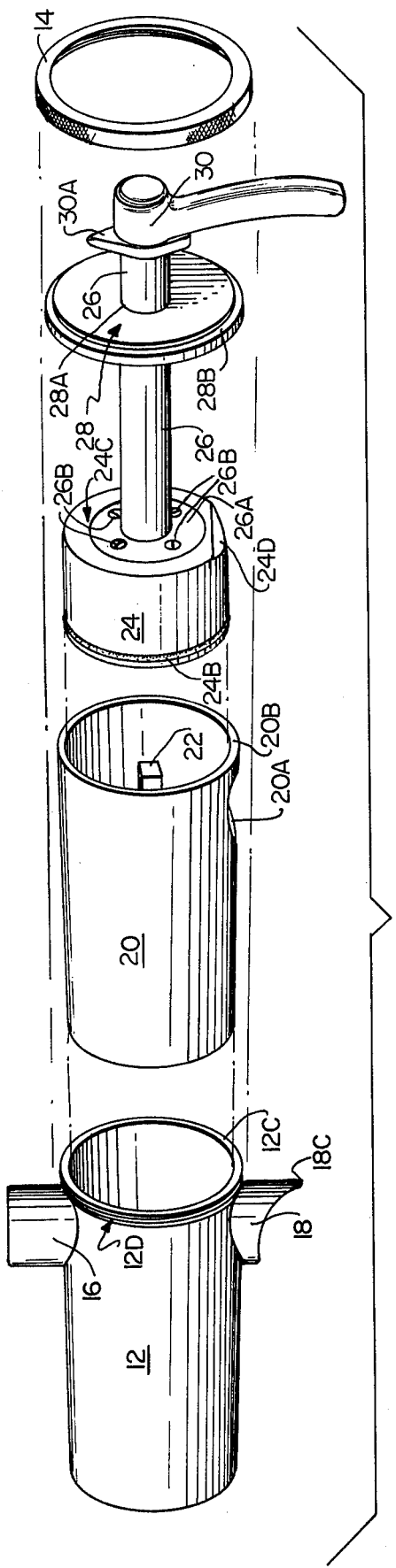
FIG. 3 is an exploded view of the valve of the present invention.

Integrally joined to and within the closed end 20 such as by welding, riveting, swaging or threading at 22A is an axially disposed guide bar 22, coaxial with the sleeve 20 and extending over the major portion of the length of the latter. The guide bar 22 is of square or rectangular cross-section as best illustrated in FIGS. 3 and 4. A suitable lubricant such as an edible oil may be used on the juxtaposed surfaces of the valve housing 12 and valve sleeve 20 to permit relative rotation therebetween. The tolerances between the two are maintained close to preclude leakage of material out through the vent holes 12B. The purpose of the vent holes 12B now becomes apparent, namely, to enhance the insertion and removal of the sleeve 20 in and from the housing 12.

Closely and conformally fitted within the sleeve 20 and telescopically and conformally receiving the guide rod 22 is a piston 24 having a center bore 24A of like rectangular cross-section to the guide rod 22 through which the latter extends. A piston ring 24B is provided on the piston 24 to seal it in the sleeve 20.

A hollow piston rod 26 is bolted by means of an integral flange 26A and bolts 26B to the operating face 24C of the piston 24, the said piston rod 26 being dimensioned to receive the guide rod 22 coaxially and telescopically within its hollow interior.

The piston rod 26 extends through a close tolerance journal port 28A in the bearing and cover plate 28 which covers and seals against the open ends 12C and 20B of the valve housing 12 and valve sleeve 20, respectively. The plate 28 is provided with an annular seal 28B into which the threaded gland nut or locking ring 14 fits to tie the entire valve assembly 10 together as best shown in FIGS. 3 and 4.

Figure 2:
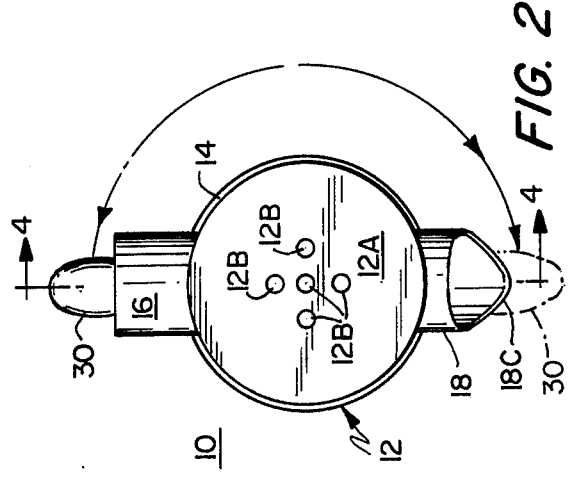
FIG. 2 is a rear end view of the valve of the present invention illustrating the extreme rotational positions of the valve actuator.

On the outermost tip of the piston rod 26 is mounted a removable handle assembly 30 which extends radially to one side of the axis of the piston rod 26 and includes a directional indicator and stop means 30A inboard thereof. The indicator 30A is pointed either vertically upward or downward when the handle 30 is in one or the other of its extreme positions. These positions are best illustrated in FIG. 2.

The handle assembly 30 is removable from the piston rod 26 to permit steam cleaning and or washing of the interior of the piston rod 26 and the rectangular bore 24A in the piston 24.

Referring to FIG. 5, the shearing action of the transfer port 20A with the intake 16A is shown in phantom lines. This action materially assists in precluding jamming of the valve sleeve by the action of chunks of food in the dispensing of semi-solid foods such as chunky soups and stews.

Referring to FIG. 6, together with FIGS. 1 and 4, boss means 32 for adjusting the valve 10 to dispense desired volumes of food material is shown as comprising split elastomeric cylinders which snap on to the piston rod 26 between the indicator and stop member 30A and the cover and bearing plate 28 such that the said boss 32 will preclude full strokes of the piston 24 in the sleeve 20, thereby limiting the volume of material ingested into the sleeve 20 via the intake port 16A and as a result, limiting the discharged volume to the ingested volume.

The removable bosses 32 may be uniform in size, such as, for example, one boss to each ounce of reduced volume or may be provided in selected sizes such as one, two and four ounce sizes.

In FIG. 4, the intake coupling 16 is shown as receiving the outlet spout 34A of a food reservoir 34 which is sealed in in the intake coupling 16 by an O-ring 34B.

Alternatively the valve housing may be welded to the tank or reservoir 34 at the top of the intake coupling 16 since the design of the valve 10 permits sterilizing and cleaning in either of these configurations.

To enhance the positive discharge of food by the piston 24, the operating surface 24C thereof is cut back along a portion 24D thereof to cam food lying in the sleeve out through the discharge port 20A during the final stages of the discharge stroke of the piston 24.

OPERATION OF THE INVENTION

In operation, referring to FIGS. 1, 2 and 4, the valve handle 30 is first rotated to its upright position (FIG. 1) with the piston rod 26 fully extended. This places the transfer port 20A in registry with the intake port 16A through the interaction of the guide rod 22 and piston 24, with the piston 24 and its cut-away portion 20D being positioned beneath the said intake port 16A.

Now, the handle 30 is used to reciprocate the rod inward of the housing 12, driving the piston 24 into the innermost end of the valve sleeve 20. This causes ingestion of a given determined volume of food material from the hopper or reservoir 34, through the intake port 16A and transfer port 20A into the valve sleeve 20 to fill the latter from the operating face 24C of the piston 24 to the interior of the bearing and cover plate 28.

By now rotating the valve handle 30 to the extreme (discharge) position shown in FIG. 4, the sleeve 20 is rotated via the guide rod 22, the transfer port 20A is rotated away from the intake port (FIG. 5) 16A and into registry with the discharge port 18A and the measured volume of food in the sleeve 20 begins to discharge by gravity from the discharge spout 18.

Now, the handle 32 is pulled outward to effect a discharge stroke of the piston 24 and force all of the food out of the sleeve 20 through the discharge spout 18 into a suitable waiting receptacle (not shown), such as a soup tourine, bowl or cup.

The next dispensing cycle is repeated by rotating the handle 32 to its uppermost position and subsequently pushing it in to effect an ingestion of another measured volume of food into the sleeve 20.

It is claimed:

1. Valve means for dispensing metered quantities of liquid and semi-solid materials from a reservoir, comprising:

a cylindrical valve housing having diametrically opposed intake and discharge ports formed in the walls thereof adjacent one end thereof and being substantially closed at the other end thereof;

a cylindrical valve sleeve conformally telescoped with said housing and rotatable therein and having a transfer port defined in the wall thereof adjacent one end thereof for selective registry with said intake and discharge ports by rotation of said sleeve;

said sleeve having its other end closed to define a metering chamber and said one end of said housing and said sleeve being closed by a common cover plate having a bearing port defined therein;

guide means internally disposed in said sleeve and affixed thereto;

a piston mounted in said sleeve for reciprocation therein and engaging said guide means to prevent relative rotation of said piston and said sleeve;

a piston rod extending from said piston through said bearing port of said cover plate; and an actuating handle in the outboard end of said piston rod;

said actuating handle and said piston rod being rotatable and reciprocable to rotate said piston and said sleeve by the interaction of said piston and said guide means between first and second extreme positions, to index said transfer port with said intake port and said discharge port, respectively and to reciprocate said piston between third and fourth extreme positions in said sleeve to ingest and discharge material, respectively, into and from said metering chamber in said sleeve through said intake and discharge ports;

said fourth extreme position juxtaposing said piston with said cover plate; and said piston being cut back along a portion thereof to provide a cam surface extending from said cover plate to a position overlying said indexed transfer and discharge ports in said fourth extreme position to constrain complete discharge of materials from said metering chamber by movement of said piston.

2. The invention defined in claim 1, wherein said guide means comprises an elongated rod of rectangular cross-section extending axially of said sleeve and mounted on the closed end thereof; and wherein said piston includes a rectangular bore defined therein for telescopically and conformally receiving said guide rod.

3. The invention defined in claim 2, wherein said piston rod is hollow and said guide rod extends coaxially into said piston rod.

4. The invention defined in claim 3, wherein said transfer port, said intake port and said discharge port are of substantially identical configuration.

5. The invention defined in claim 4, wherein said valve means further includes removable boss means between said handle and said common cover plate to preclude full strokes of said piston in said sleeve and thereby vary the amount of material ingested into and discharged from said metering chamber in said sleeve.

6. The invention defined in claim 3, wherein said valve means further includes removable boss means between said handle and said common cover plate to preclude full strokes of said piston in said sleeve and thereby vary the amount of material ingested into and discharged from said metering chamber in said sleeve.

7. The invention defined in claim 2, wherein said transfer port, said intake port and said discharge port are of substantially identical configuration.

8. The invention defined in claim 7, wherein said valve means further includes removable boss means between said handle and said common cover plate to preclude full strokes of said piston in said sleeve and thereby vary the amount of material ingested into and discharged from said metering chamber in said sleeve.

9. The invention defined in claim 2, wherein said valve means further includes removable boss means between said handle and said common cover plate to preclude full strokes of said piston in said sleeve and thereby vary the amount of material ingested into and discharged from said metering chamber in said sleeve.

10. The invention defined in claim 1, wherein said transfer port, said intake port and said discharge port are of substantially identical configuration.

11. The invention defined in claim 10, wherein said valve means further includes removable boss means between said handle and said common cover plate to preclude full strokes of said piston in said sleeve and thereby vary the amount of material ingested into and discharged from said metering chamber in said sleeve.

* * * * *